US009385525B2

(12) United States Patent
Koshizuka et al.

(10) Patent No.: US 9,385,525 B2
(45) Date of Patent: Jul. 5, 2016

(54) MAGNETIZING INRUSH CURRENT SUPPRESSION DEVICE

(71) Applicant: KABUSHIKI KAISHA TOSHIBA, Minato-ku, Tokyo (JP)

(72) Inventors: Tadashi Koshizuka, Saitama (JP); Minoru Saito, Kamakura (JP); Shiro Maruyama, Yokohama (JP); Hiroyuki Maehara, Fuchu (JP); Koji Suzuki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 324 days.

(21) Appl. No.: 14/205,090

(22) Filed: Mar. 11, 2014

(65) Prior Publication Data

US 2014/0192443 A1 Jul. 10, 2014

Related U.S. Application Data

(63) Continuation of application No. PCT/JP2012/072045, filed on Aug. 30, 2012.

(30) Foreign Application Priority Data

Sep. 14, 2011 (JP) .................................. 2011-201156

(51) Int. Cl.
*H02H 7/04* (2006.01)
*H02H 9/00* (2006.01)
(Continued)

(52) U.S. Cl.
CPC ............... *H02H 9/002* (2013.01); *H01H 9/563* (2013.01); *H02H 3/08* (2013.01); *H02H 3/44* (2013.01); *H02H 7/04* (2013.01); *H02H 7/042* (2013.01); *H02H 7/045* (2013.01); *H02H 9/04* (2013.01)

(58) Field of Classification Search
USPC ............................................ 361/35, 36, 93.9
See application file for complete search history.

(56) References Cited

U.S. PATENT DOCUMENTS 5,784,233 A * 7/1998 Bastard .................. H02H 7/045
361/115
8,310,106 B2 11/2012 Koshiduka et al.
(Continued)

FOREIGN PATENT DOCUMENTS

CN 101563744 A 10/2009
CN 102142676 A 8/2011
(Continued)

OTHER PUBLICATIONS

Chinese Office Action (and English translaton thereof) dated May 29, 2015, issued in counterpart Chinese Application No. 201280030329.1.
(Continued)

*Primary Examiner* — Danny Nguyen
(74) *Attorney, Agent, or Firm* — Holtz, Holtz & Volek PC

(57) ABSTRACT

According to one embodiment, there is provided a magnetizing inrush current suppression device. A closing phase determination unit determines a phase position for suppressing the magnetizing inrush current among phase positions in which the prospective magnetic flux calculated by the prospective magnetic flux calculation unit and the residual magnetic flux calculated by the residual magnetic flux calculation unit coincide between the lines of the minimum residual magnetic flux determined by the minimum residual magnetic flux determination unit, as a closing phase position. A closing unit simultaneously closes the three phases of the circuit-breaker at the determined closing phase position.

7 Claims, 9 Drawing Sheets

(51) Int. Cl.
*H01H 9/56* (2006.01)
*H02H 7/045* (2006.01)
*H02H 3/08* (2006.01)
*H02H 9/04* (2006.01)
*H02H 3/44* (2006.01)

(56) References Cited

U.S. PATENT DOCUMENTS

| | | | |
|---|---|---|---|
| 8,564,159 B2 | 10/2013 | Udagawa et al. | |
| 2010/0039737 A1* | 2/2010 | Koshizuka | H02H 9/002 361/36 |
| 2010/0141235 A1 | 6/2010 | Koshiduka et al. | |
| 2011/0181989 A1 | 7/2011 | Udagawa et al. | |
| 2011/0204870 A1 | 8/2011 | Tsutada et al. | |
| 2012/0236443 A1 | 9/2012 | Kinoshita et al. | |
| 2013/0176021 A1 | 7/2013 | Udagawa et al. | |

FOREIGN PATENT DOCUMENTS

| | | |
|---|---|---|
| JP | 2002-075145 A | 3/2002 |
| JP | 2007305491 A | 11/2007 |
| JP | 2008140580 A | 6/2008 |
| JP | 2010-73666 A | 4/2010 |
| JP | 2010130849 A | 6/2010 |
| JP | 4611455 B2 | 1/2011 |
| JP | 2011-154974 A | 8/2011 |
| WO | WO 2010/035778 A1 | 4/2010 |
| WO | WO 2011/086671 A1 | 7/2011 |
| WO | WO 2008/065757 A | 8/2011 |

OTHER PUBLICATIONS

International Preliminary Report on Patentability (IPRP) dated Mar. 27, 2014 issued in International Application No. PCT/JP2012/072045.

John H. Brunke, et al., "Elimination of Transformer Inrush Currents by Controlled Switching—Part I: Theoretical Considerations", IEEE Transactions on Power Delivery, IEEE, Apr. 2001, vol. 16, No. 2, pp. 276-280 (in English).

International Search Report (ISR) dated Sep. 25, 2012 (and English translation thereof) issued in International Application No. PCT/JP2012/072045.

* cited by examiner

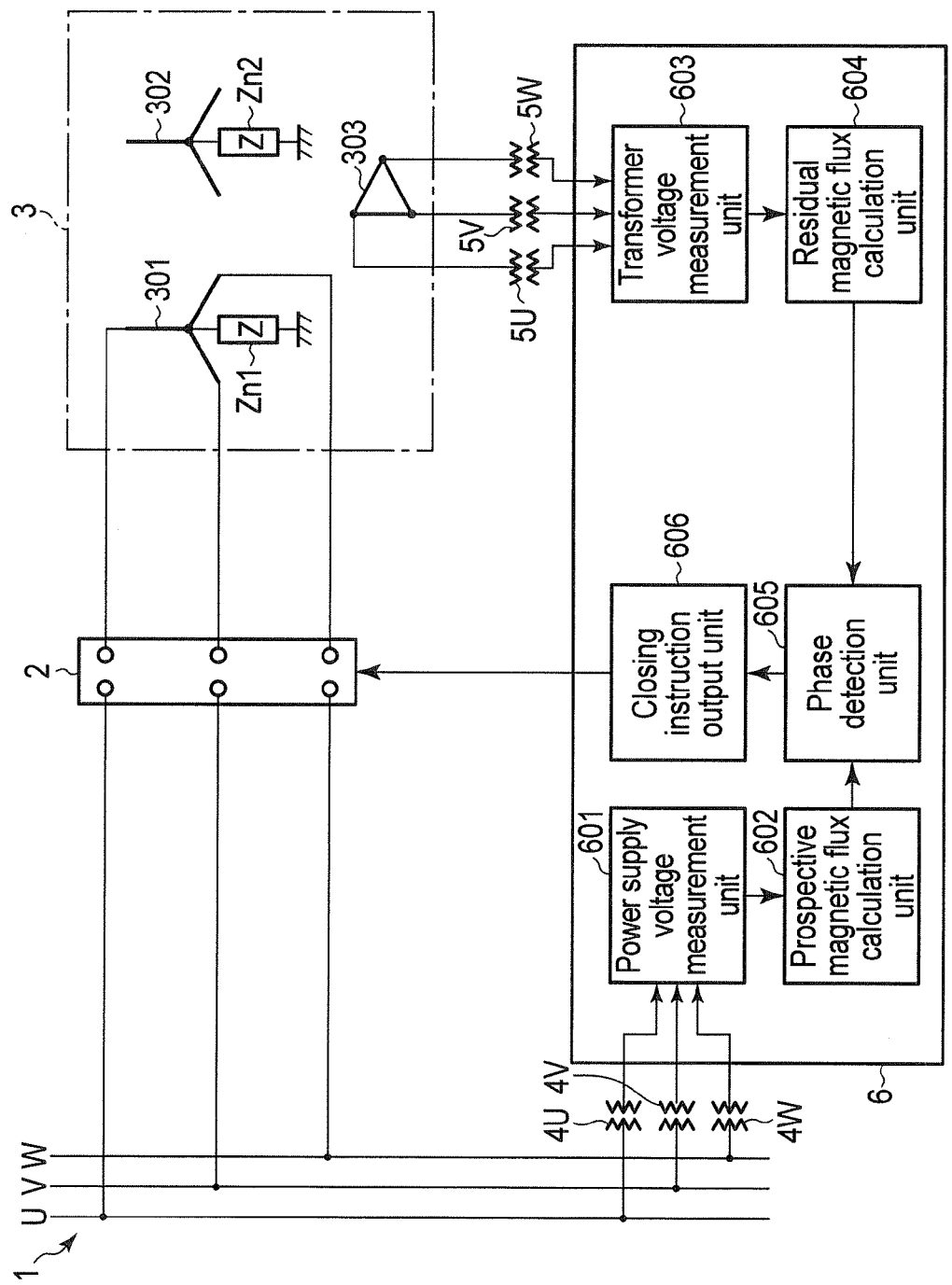
F I G. 1

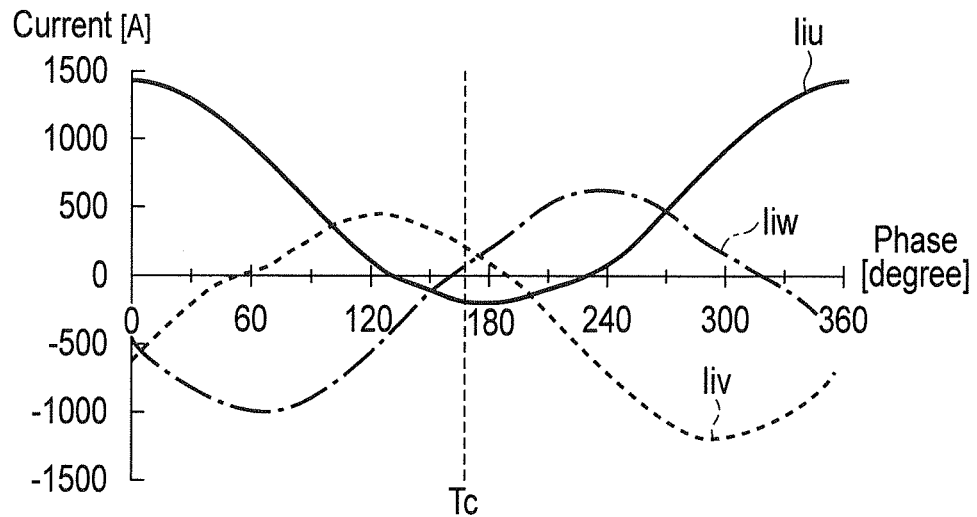
F I G. 10
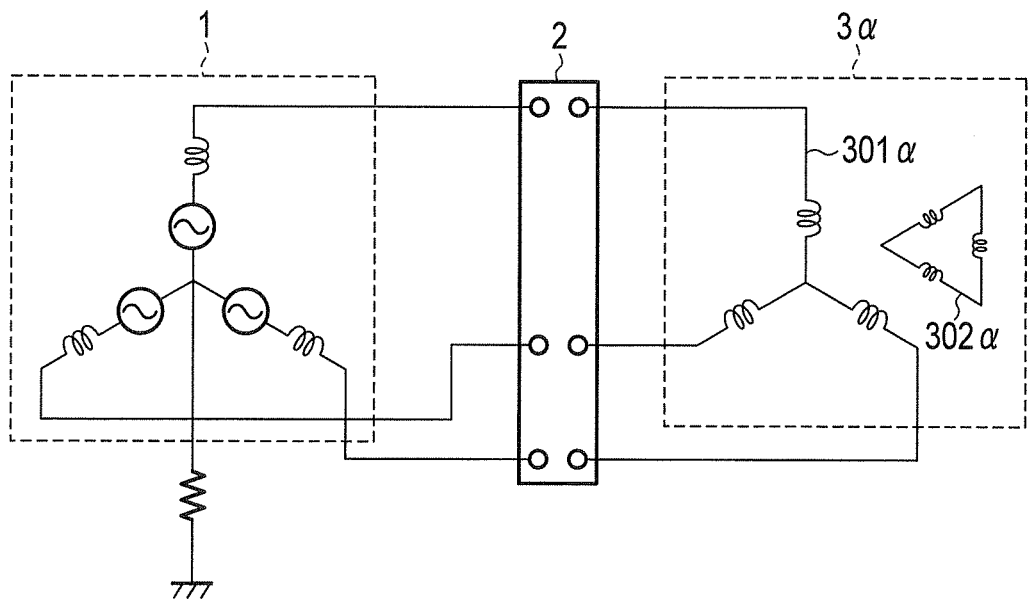
F I G. 11

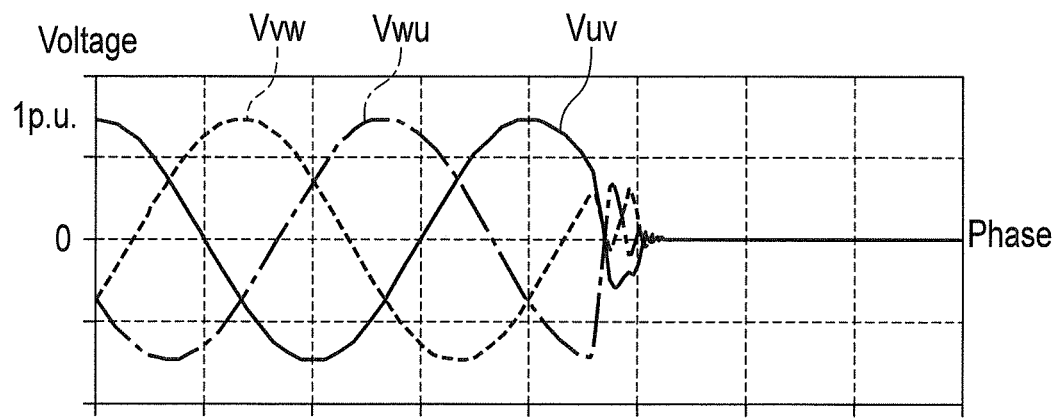
F I G. 14
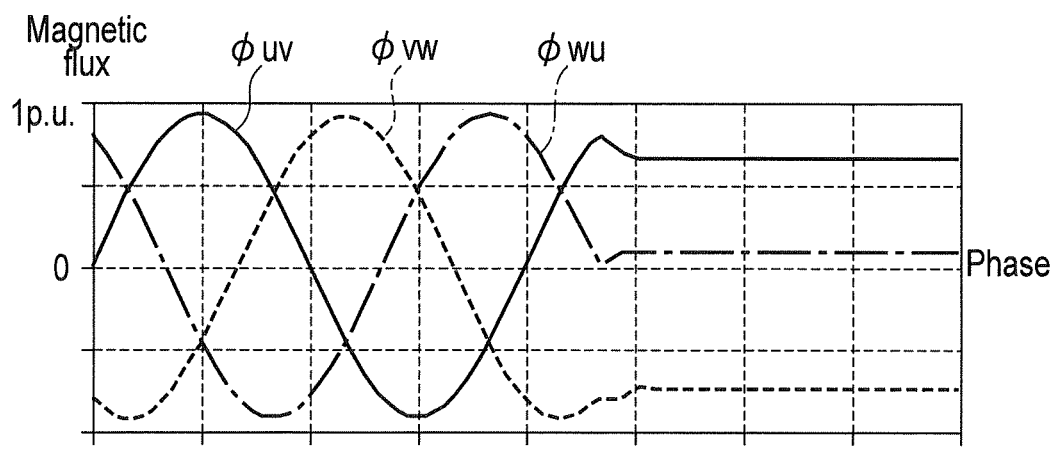
F I G. 15

MAGNETIZING INRUSH CURRENT SUPPRESSION DEVICE

CROSS-REFERENCE TO RELATED APPLICATIONS

This application is a Continuation Application of PCT Application No. PCT/JP2012/072045, filed Aug. 30, 2012 and based upon and claiming the benefit of priority from Japanese Patent Application No. 2011-201156, filed Sep. 14, 2011, the entire contents of all of which are incorporated herein by reference.

FIELD

Embodiments described herein relate generally to a magnetizing inrush current suppression device for suppressing a magnetizing inrush current that occurs when a transformer is supplied with power.

BACKGROUND

Generally, it is known that a large magnetizing inrush current will flow when no-load magnetizing is performed by supplying power while residual magnetic flux is present in a transformer core. The magnitude of the magnetizing inrush current becomes several times the rated load current of the transformer. When such a large magnetizing inrush current flows, system voltage fluctuates. If the voltage fluctuation is large, an influence will be given to customers in some cases.

As a method for suppressing the magnetizing inrush current, a suppressing method using a circuit-breaker with a resistor having a turn-on resistor and contact serially connected is provided. The circuit-breaker with the resistor is connected in parallel with the circuit-breaker main contact. The circuit-breaker with the resistor is connected with a power system prior to the circuit-breaker main contact.

Further, there is provided a method for suppressing a magnetizing inrush current by first closing a given one phase and then closing the remaining two phases when a three-phase transformer of a direct grounding system is connected with a power system by use of three single-phase circuit-breakers. With this suppressing method, the magnitude of the residual magnetic flux when the transformer is interrupted is grasped.

Additionally, there is provided a method for calculating residual magnetic flux when a transformer of an ineffective grounding system is interrupted by measuring phase voltages to suppress a magnetizing inrush current of the transformer.

However, the circuit-breaker having the circuit-breaker with the resistor added thereto will become large. Further, when the circuit-breaker is of a three-phase simultaneous operation type, the magnetizing inrush current cannot be suppressed by closing the circuit-breakers for respective phases. In addition, a zero-phase voltage that occurs after interruption of the first phase remains as DC voltage in the transformer after closing of the circuit-breaker and the residual magnetic flux cannot be precisely derived in some cases.

PRIOR ART REFERENCE

Patent Literature

[Patent Literature 1]
Jpn. Pat. Appln. KOKAI Publication No. 2002-75145
[Patent Literature 2]
Japanese Patent No. 4611455

Non-Patent Literature

[Non-Patent Literature 1]
John H. Brunke, et al., "Elimination of Transformer Inrush Currents by Controlled Switching—Part I: Theoretical Considerations", IEEE TRANSACTIONS ON POWER DELIVERY, IEEE, April, 2001, Vol. 16, No. 2, p. 276-280

Under the circumstances, it is desired to provide a magnetizing inrush current suppression device capable of suppressing a magnetizing inrush current of a transformer that occurs when three phases of a circuit-breaker are simultaneously closed even if a DC voltage remains in the transformer.

BRIEF DESCRIPTION OF THE DRAWINGS

FIG. 1 is a configuration diagram showing the configuration of a power system to which a magnetizing inrush current suppression device according to a first embodiment of the present invention is applied;

FIG. 10 is a waveform diagram showing a magnetizing inrush current in the third example of the closing method by use of the magnetizing inrush current suppression device according to the first embodiment;

FIG. 11 is a schematic diagram obtained by schematically showing one example of a power system to which the magnetizing inrush current suppression device according to the first embodiment of the present invention is applied;

FIG. 14 is a waveform diagram showing line voltages of a secondary winding of the transformer when the transformer is interrupted;

FIG. 15 is a waveform diagram showing magnetic fluxes calculated by integrating the line voltages of the secondary winding of the transformer when the transformer is interrupted.

DETAILED DESCRIPTION

Figure 2:
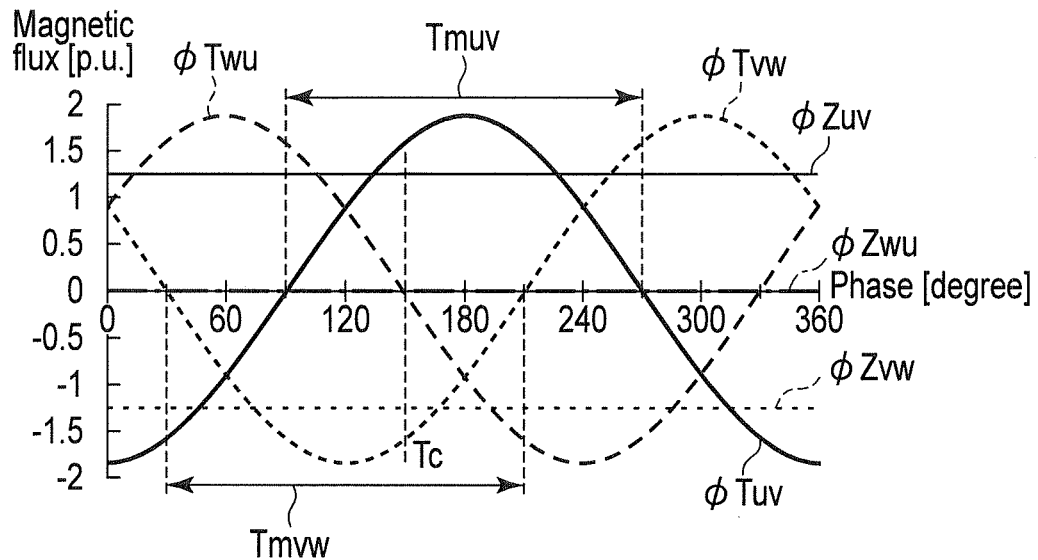
FIG. 2 is a waveform diagram showing prospective magnetic flux and residual magnetic flux in a first example of a closing method by use of the magnetizing inrush current suppression device according to the first embodiment.

Embodiments will be described with reference to the drawings.

In general, according to one embodiment, there is provided a magnetizing inrush current suppression device for controlling a circuit-breaker that closes and opens connection between a transformer having a Y-connected primary winding and Δ-connected secondary winding and a three-phase AC power supply to suppress a magnetizing inrush current. The magnetizing inrush current suppression device comprises a power supply-side voltage measurement unit configured to measure three-phase AC voltages on a power supply side of the circuit-breaker, a prospective magnetic flux calculation unit configured to calculate prospective magnetic fluxes between three lines of the secondary winding of the transformer based on the three-phase AC voltages measured by the power supply-side voltage measurement unit, a transformer voltage measurement unit configured to measure respective terminal voltages of the secondary winding of the transformer, a residual magnetic flux calculation unit configured to calculate residual magnetic fluxes between the three lines based on the respective terminal voltages measured by the transformer voltage measurement unit, a minimum residual magnetic flux determination unit configured to determine the minimum residual magnetic flux among the residual magnetic fluxes between the three lines calculated by the residual magnetic flux calculation unit, a closing phase determination unit configured to determine a phase position for suppressing the magnetizing inrush current among the phases in which the prospective magnetic flux calculated by the prospective magnetic flux calculation unit and the residual magnetic flux calculated by the residual magnetic flux calculation unit coincide between the lines of the minimum residual magnetic flux determined by the minimum residual magnetic flux determination unit, as a closing phase position, and a closing unit configured to simultaneously close the three phases of the circuit-breaker at the closing phase position determined by the closing phase determination unit.

First Embodiment

FIG. 1 is a configuration diagram showing the configuration of a power system to which a magnetizing inrush current suppression device 6 according to a first embodiment of the present invention is applied. In this case, the same symbols are attached to the same portions in the following drawings and the detailed explanation thereof is omitted and different portions are mainly described. Also, in the following embodiment, repetitive explanations are omitted.

The power system according to this embodiment includes a power supply bus 1, circuit-breaker 2, transformer 3, three-phase power supply voltage detectors 4U, 4V, 4W provided on the power supply bus 1, transformer tertiary voltage detectors 5U, 5V, 5W for three phases (for transformer terminals) provided on the tertiary side of the transformer 3, and the magnetizing inrush current suppression device 6.

The power supply bus 1 is a bus of the power system including a three-phase AC power supply having a U phase, V phase and W phase.

The transformer 3 is connected to the power supply bus 1 via the circuit-breaker 2. The transformer 3 is provided on the ineffective grounding system. The transformer 3 is a three-phase transformer with three windings for transforming the three-phase AC voltages. The transformer 3 includes a primary winding 301, secondary winding 302 and tertiary winding 303. The primary winding 301 and secondary winding 302 are Y-connected. The tertiary winding 303 is Δ-connected. The neutral point of the primary winding 301 is grounded via impedance Zn1. The neutral point of the secondary winding 302 is grounded via impedance Zn2.

The circuit-breaker 2 is provided between the power supply bus 1 and the transformer 3. The circuit-breaker 2 is a three-phase simultaneous operation type circuit-breaker in which all of the main contacts of the three phases of U phase, V phase and W phase are simultaneously operated. The transformer 3 is supplied with power by means of the power supply bus 1 by closing the circuit-breaker 2. The transformer 3 is electrically interrupted from the power supply bus 1 by opening the circuit-breaker 2.

The three power supply voltage detectors 4U, 4V, 4W are instrument devices for measuring respective phase voltages (voltages to ground) of the U phase, V phase, W phase of the power supply bus 1. For example, the power supply voltage detectors 4U, 4V, 4W are voltage-dividing devices such as instrument transformers (VT, Voltage Transformers) or capacitor type instrument transformers (PD, Potential Devices). The power supply voltage detectors 4U, 4V, 4W are connected between the respective phases of the power supply bus 1 and the ground. The power supply voltage detectors 4U, 4V, 4W output detected values as detection signals to the magnetizing inrush current suppression device 6.

The three transformer tertiary voltage detectors 5U, 5V, 5W are instrument devices for measuring respective terminal voltages (U phase, V phase, W phase) on the tertiary side of the transformer 3. The transformer tertiary voltage detectors 5U, 5V, 5W are the same instrument devices as the power supply voltage detectors 4U, 4V, 4W. The transformer tertiary voltage detectors 5U, 5V, 5W are connected between the respective terminals of the transformer 3 and the ground. The transformer tertiary voltage detectors 5U, 5V, 5W output detected values as detection signals to the magnetizing inrush current suppression device 6.

The magnetizing inrush current suppression device 6 outputs a closing instruction to the main contacts of the circuit-breaker 2 based on detection signals respectively received from the power supply voltage detectors 4U, 4V, 4W and transformer tertiary voltage detectors 5U, 5V, 5W. As a result, the circuit-breaker 2 is closed.

The configuration of the magnetizing inrush current suppression device 6 is explained with reference to FIG. 1 to FIG. 10. FIG. 2 to FIG. 10 are waveform diagrams showing magnetic fluxes and voltages for explaining the closing method by use of the magnetizing inrush current suppression device 6.

The magnetizing inrush current suppression device 6 includes a power supply voltage measurement unit 601, prospective magnetic flux calculation unit 602, transformer voltage measurement unit 603, residual magnetic flux calculation unit 604, phase detection unit 605 and closing instruction output unit 606.

The power supply voltage measurement unit 601 measures respective phase voltages of the power supply bus 1 based on detection signals detected by the power supply voltage detectors 4U, 4V, 4W. The power supply voltage measurement unit 601 outputs the respective measured phase voltages to the prospective magnetic flux calculation unit 602.

The prospective magnetic flux calculation unit 602 calculates respective line voltages Vuv, Vvw, Vwu between UV phases, VW phases and WU phases based on the respective phase voltages measured by the power supply voltage measurement unit 601. The prospective magnetic flux calculation unit 602 integrates respective calculated line voltages Vuv, Vvw, Vwu. The prospective magnetic flux calculation unit 602 uses the integrated values as magnetic fluxes under steady state (prospective magnetic fluxes) $\phi$Tuv, $\phi$Tvw, $\phi$Twu. The prospective magnetic flux calculation unit 602 outputs calculated prospective magnetic fluxes $\phi$Tuv, $\phi$Tvw, $\phi$Twu to the phase detection unit 605.

The transformer voltage measurement unit 603 measures respective terminal voltages (tertiary phase voltages) of the transformer 3 based on detection signals detected by the transformer tertiary voltage detectors 5U, 5V, 5W. The transformer voltage measurement unit 603 outputs the respective measured terminal voltages to the residual magnetic flux calculation unit 604.

The residual magnetic flux calculation unit 604 calculates respective line voltages Vuv, Vvw, Vwu between the UV phases, VW phases and WU phases before and after interruption of the transformer 3 by means of the circuit-breaker 2 based on the respective terminal voltages measured by the transformer voltage measurement unit 603. The residual magnetic flux calculation unit 604 integrates respective calculated line voltages Vuv, Vvw, Vwu. The residual magnetic flux calculation unit 604 uses the integrated values as residual magnetic fluxes (tertiary line magnetic fluxes) $\phi$Zuv, $\phi$Zvw, $\phi$Zwu of the core of the transformer 3. The residual magnetic flux calculation unit 604 outputs calculated residual magnetic fluxes $\phi$Zuv, $\phi$Zvw, $\phi$Zwu to the phase detection unit 605.

To the phase detection unit 605, residual magnetic fluxes $\phi$Zuv, $\phi$Zvw, $\phi$Zwu calculated by the residual magnetic flux calculation unit 604 and prospective magnetic fluxes $\phi$Tuv, $\phi$Tvw, $\phi$Twu calculated by the prospective magnetic flux calculation unit 602 are input. The phase detection unit 605 detects the residual magnetic flux having the minimum absolute value (that is hereinafter simply referred to as "minimum residual magnetic flux") and the residual magnetic flux having the maximum absolute value (that is hereinafter simply referred to as "maximum residual magnetic flux") among residual magnetic fluxes $\phi$Zuv, $\phi$Zvw, $\phi$Zwu calculated by the residual magnetic flux calculation unit 604. The phase detection unit 605 determines a phase range (time domain) in which the prospective magnetic flux and residual magnetic flux have the same polarity between the lines of the detected maximum residual magnetic flux. The phase detection unit 605 detects a phase in which the prospective magnetic flux and residual magnetic flux coincide in the phase range in which the prospective magnetic flux and residual magnetic flux have the same polarity between the lines of the maximum residual magnetic flux, between the lines of the determined minimum residual magnetic flux. The phase detection unit 605 outputs the detected phase as closing target phase Tc to the closing instruction output unit 606.

The closing instruction output unit 606 outputs a closing instruction with respect to the operation mechanism that drives the main contacts of the circuit-breaker 2 at closing target phase Tc detected by the phase detection unit 605. As a result, the three phases of the circuit-breaker 2 are simultaneously closed.

Next, suppression of a magnetizing inrush current by the magnetizing inrush current suppression device 6 is explained with reference to FIG. 2 to FIG. 10.

Figure 3:
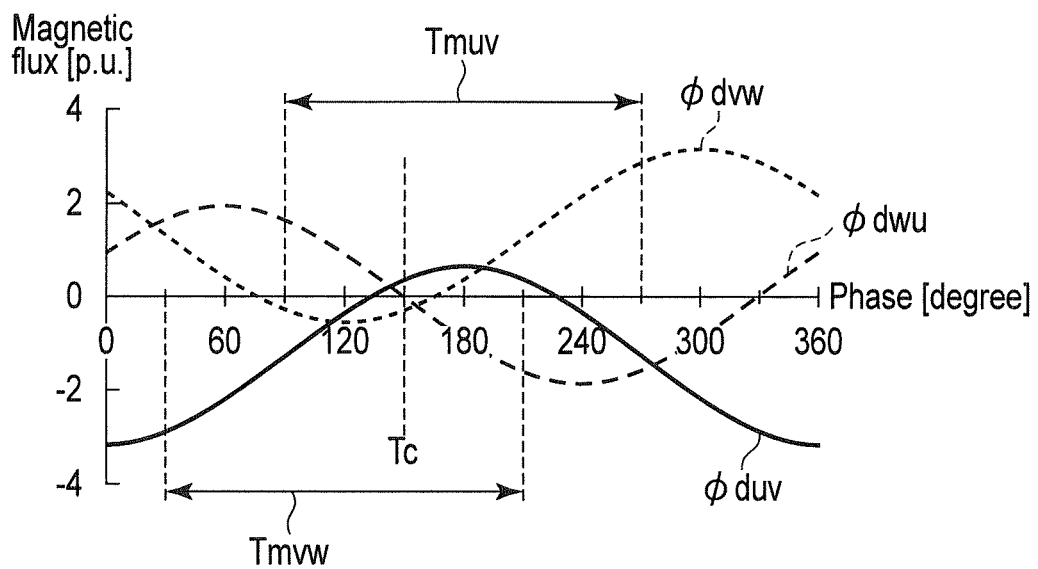
FIG. 3 is a waveform diagram showing a difference magnetic flux between the prospective magnetic flux and the residual magnetic flux in the first example of the closing method by use of the magnetizing inrush current suppression device according to the first embodiment.
Figure 4:
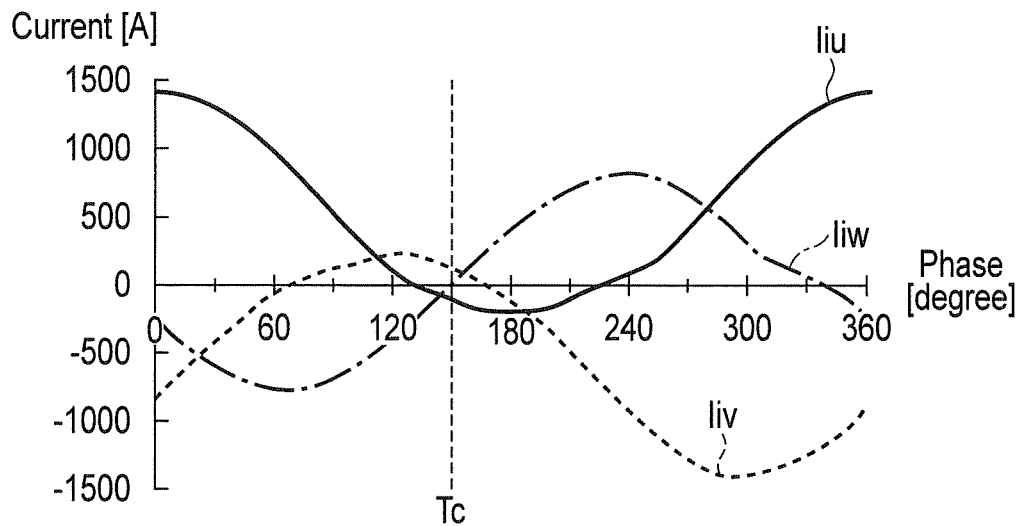
FIG. 4 is a waveform diagram showing a magnetizing inrush current in the first example of the closing method by use of the magnetizing inrush current suppression device according to the first embodiment.
Figure 5:
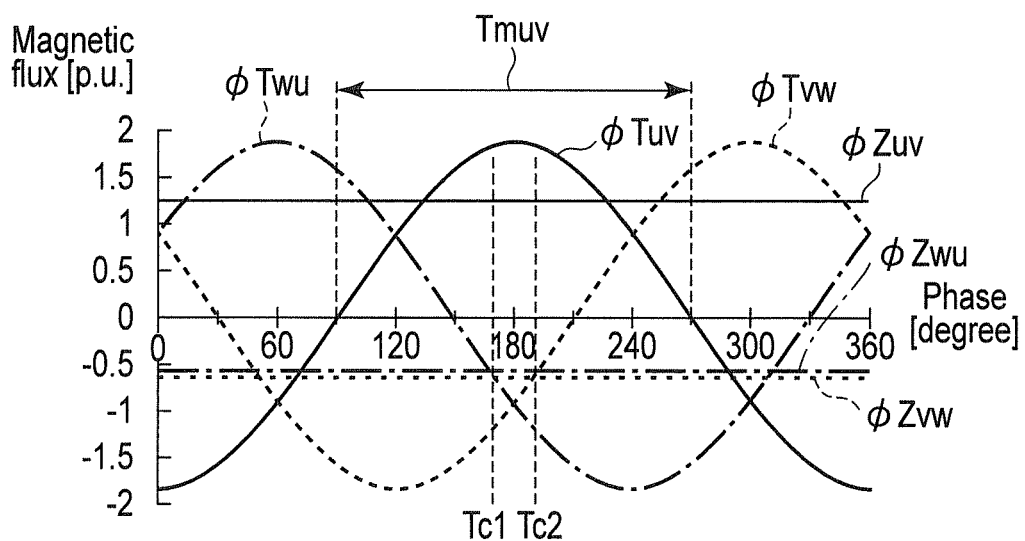
FIG. 5 is a waveform diagram showing prospective magnetic flux and residual magnetic flux in a second example of the closing method by use of the magnetizing inrush current suppression device according to the first embodiment.
Figure 6:
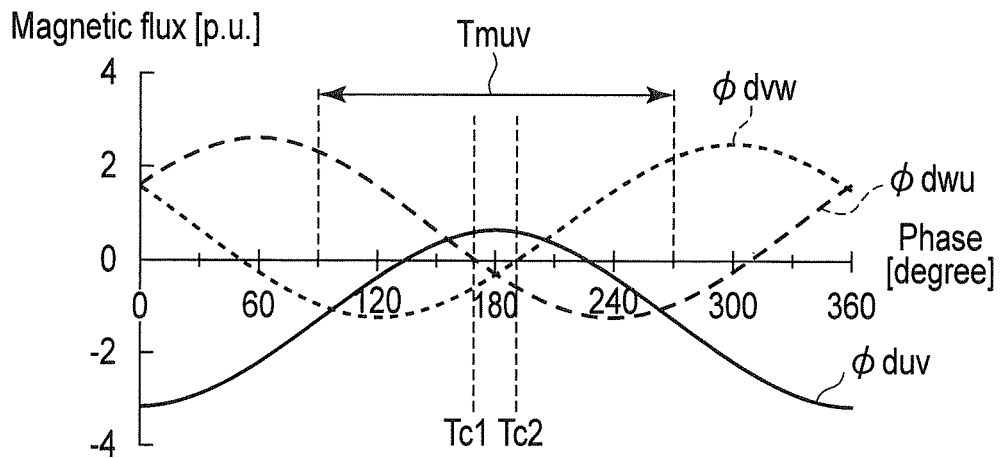
FIG. 6 is a waveform diagram showing a difference magnetic flux between the prospective magnetic flux and the residual magnetic flux in the second example of the closing method by use of the magnetizing inrush current suppression device according to the first embodiment.
Figure 7:
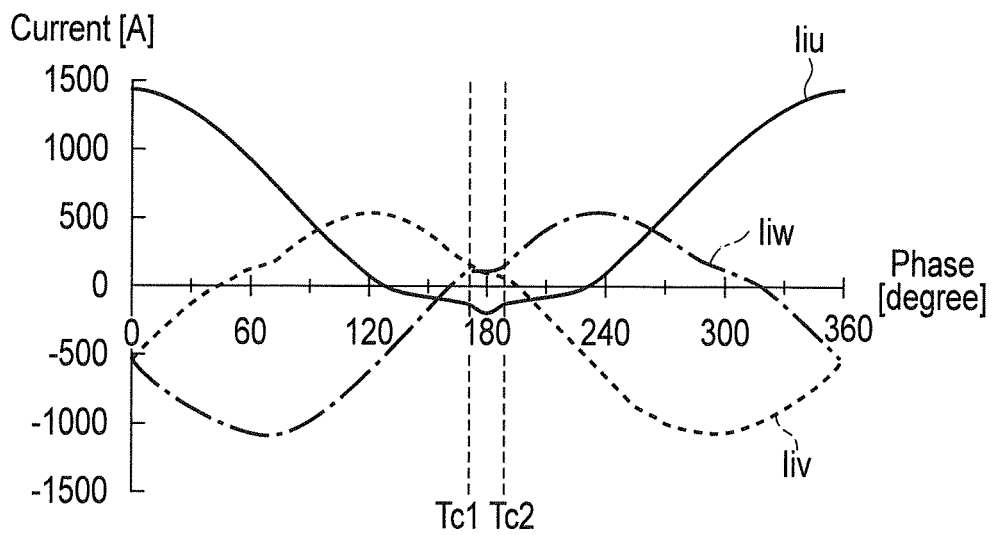
FIG. 7 is a waveform diagram showing a magnetizing inrush current in the second example of the closing method by use of the magnetizing inrush current suppression device according to the first embodiment.
Figure 8:
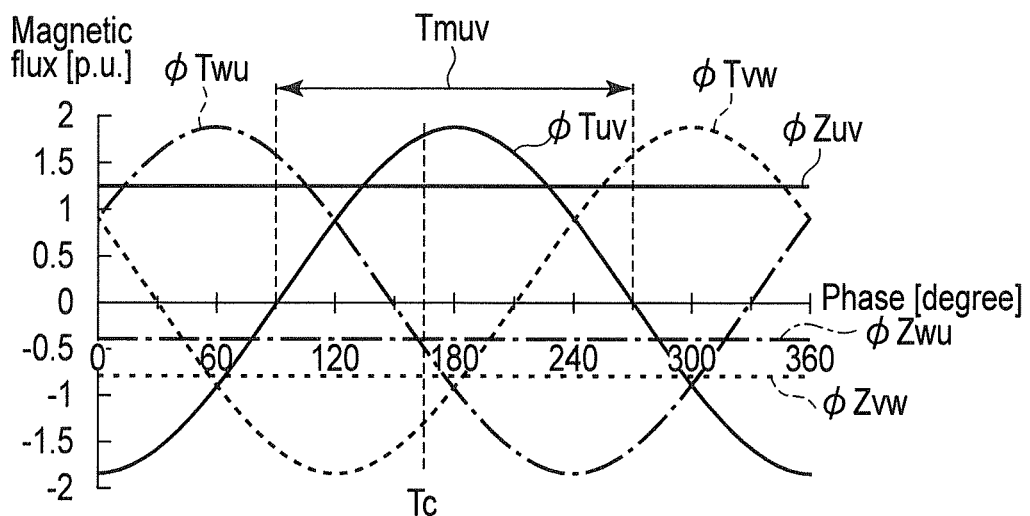
FIG. 8 is a waveform diagram showing prospective magnetic flux and residual magnetic flux in a third example of the closing method by use of the magnetizing inrush current suppression device according to the first embodiment.
Figure 9:
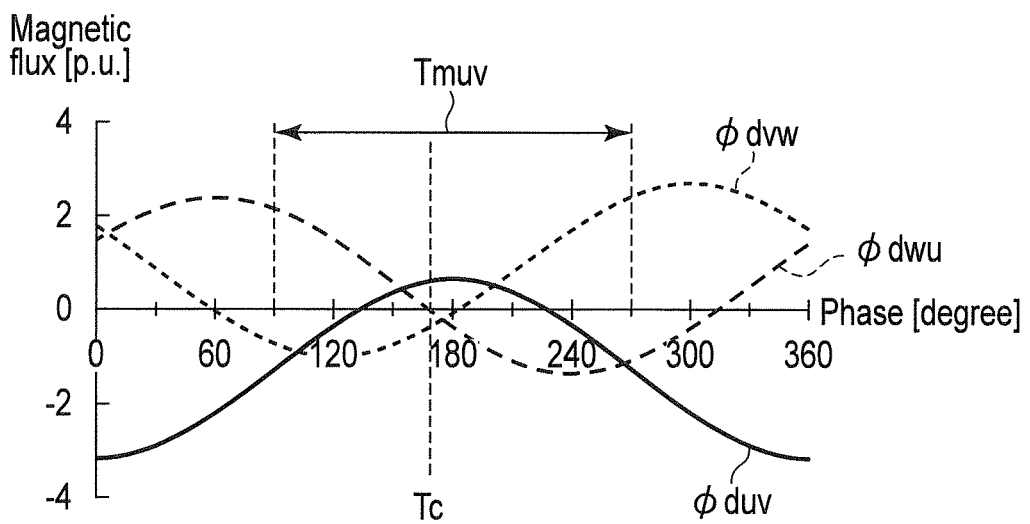
FIG. 9 is a waveform diagram showing a difference magnetic flux between the prospective magnetic flux and the residual magnetic flux in the third example of the closing method by use of the magnetizing inrush current suppression device according to the first embodiment.

In FIG. 2 to FIG. 10, waveform diagrams derived by calculation of waveforms of voltages and magnetic fluxes obtained when the transformer 3 having three single-phase transformers of 3.3 kV-415 V-300 kVA connected in Y-connection-$\Delta$-connection form are shown. FIG. 2 to FIG. 4 show the first state of the transformer 3. FIG. 5 to FIG. 7 show the second state of the transformer 3. FIG. 8 to FIG. 10 show the third state of the transformer 3. The first state, second state and third state are obtained by changing residual magnetic fluxes $\phi$Zuv, $\phi$Zvw, $\phi$Zwu between lines of the $\Delta$-connected windings and interruption phases.

A detection method of closing target phase Tc in the first state of the transformer 3 by use of the phase detection unit 605 is explained with reference to FIG. 2 to FIG. 4. FIG. 2 shows the respective waveforms of prospective magnetic fluxes $\phi$Tuv, $\phi$Tvw, $\phi$Twu and residual magnetic fluxes $\phi$Zuv, $\phi$Zvw, $\phi$Zwu. FIG. 3 shows the respective waveforms of difference magnetic fluxes $\phi$duv, $\phi$dvw, $\phi$dwu obtained by subtracting residual magnetic fluxes $\phi$Zuv, $\phi$Zvw, $\phi$Zwu from prospective magnetic fluxes $\phi$Tuv, $\phi$Tvw, $\phi$Twu between respective lines. FIG. 4 shows the correlation between the closing phase position and magnetizing inrush currents Iiu, Iiv, Iiw for the respective phases caused by the closing phase position in the first state.

In the first state, residual magnetic flux $\phi$Zuv between the UV phases has the positive polarity, residual magnetic flux $\phi$Zvw between the VW phases has the negative polarity and residual magnetic flux $\phi$Zwu between the WU phases is substantially zero. The minimum residual magnetic flux is residual magnetic flux $\phi$Zwu between the WU phases.

In this case, the absolute values of residual magnetic flux $\phi$Zuv between the UV phases and residual magnetic flux $\phi$Zvw between the VW phases are substantially the same. Therefore, it is possible to set either residual magnetic flux $\phi$Zuv between the UV phases or residual magnetic flux $\phi$Zvw between the VW phases as the maximum residual magnetic flux. Thus, it is not always necessary to precisely determine the maximum residual magnetic flux for determination of setting the maximum residual magnetic flux. It is also possible to determine the second maximum residual magnetic flux as the maximum residual magnetic flux if the magnetic flux difference is considered to be close to the actual maximum residual magnetic flux.

In FIG. 2 and FIG. 3, phase range Tmuv of closing target phase Tc when residual magnetic flux $\phi$Zuv between the UV phases is set as the maximum residual magnetic flux and phase range Tmvv of closing target phase Tc when residual magnetic flux $\phi$Zvw between the VW phases is set as the maximum residual magnetic flux are respectively shown.

As shown in FIG. 2, the phase detection unit 605 detects a phase in which residual magnetic flux $\phi$Zwu between the WU phases and prospective magnetic flux $\phi$Twu between the WU phases coincide in phase range Tmuv set by the magnetic flux between the UV phases or phase range Tmvw set by the magnetic flux between the VW phases as closing target phase Tc. In the first state shown in FIG. 2 and FIG. 3, the same phase is obtained even when it is detected in either phase range Tmuv set by the magnetic flux between the UV phases or phase range Tmvw set by the magnetic flux between the VW phases. If difference magnetic flux $\phi$dwu between the WU phases shown in FIG. 3 is obtained, closing target phase Tc can be detected by detecting a zero point.

As shown in FIG. 4, it is understood that, when the circuit-breaker 2 is closed in a phase position of approximately 150 degrees used as closing target phase Tc, magnetizing inrush currents Iiu, Iiv, Iiw of the respective phases are smaller in comparison with a case wherein it is closed in another phase position.

Next, a detection method of closing target phase Tc in the second state of the transformer 3 by use of the phase detection unit 605 is explained with reference to FIG. 5 to FIG. 7. FIG. 5 shows the respective waveforms of prospective magnetic fluxes φTuv, φTvw, φTwu and residual magnetic fluxes φZuv, φZvw, φZwu. FIG. 6 shows the waveforms of difference magnetic fluxes φduv, φdvw, φdwu obtained by respectively subtracting residual magnetic fluxes φZuv, φZvw, φZwu from prospective magnetic fluxes φTuv, φTvw, φTwu between respective lines. FIG. 7 shows the correlation between the closing phase position and magnetizing inrush currents Iiu, Iiv, Iiw of the respective phases caused by the closing phase position in the second state.

In the second state, residual magnetic flux φZuv between the UV phases has the positive polarity and residual magnetic flux φZvw between the VW phases and residual magnetic flux φZwu between the WU phases have the negative polarity. The minimum residual magnetic flux is residual magnetic flux φZwu between the WU phases. The maximum residual magnetic flux is residual magnetic flux φZuv between the UV phases.

In this case, since residual magnetic flux φZvw between the VW phases and residual magnetic flux φZwu between the WU phases have substantially the same value, residual magnetic flux φZvw between the VW phases may be set as the minimum residual magnetic flux. Thus, it is not always necessary to precisely determine the minimum residual magnetic flux for determination of setting the minimum residual magnetic flux. It is also possible to determine the second minimum residual magnetic flux as the minimum residual magnetic flux if the magnetic flux difference is considered to be close to the actual minimum residual magnetic flux.

In FIG. 5 to FIG. 7, closing target phase Tc1 in which residual magnetic flux φZwu between the WU phases is used as the minimum residual magnetic flux and closing target phase Tc2 in which residual magnetic flux φZvw between the VW phases is used as the minimum residual magnetic flux are respectively shown.

As shown in FIG. 5, the phase detection unit 605 detects a phase in which residual magnetic flux φZwu between the WU phases and prospective magnetic flux φTwu between the WU phases coincide or a phase in which residual magnetic flux φZvw between the VW phases and prospective magnetic flux φTvw between the VW phases coincide in phase range Tmuv set by the magnetic flux between the UV phases as closing target phase Tc1, Tc2. Closing target phase Tc1, Tc2 can be detected by detecting a zero point if difference magnetic flux φdwu between the WU phases or difference magnetic flux φdvw between the VW phases shown in FIG. 6 is provided.

As shown in FIG. 7, it is understood that, when the circuit-breaker 2 is closed in a phase position of approximately 180 degrees used as closing target phase Tc1 or closing target phase Tc2, magnetizing inrush currents Iiu, Iiv, Iiw of the respective phases are smaller in comparison with a case wherein it is closed in another phase position.

Next, a detection method of closing target phase Tc in the third state of the transformer 3 by use of the phase detection unit 605 is explained with reference to FIG. 8 to FIG. 10. FIG. 8 shows the respective waveforms of prospective magnetic fluxes φTuv, φTvw, φTwu and residual magnetic fluxes φZuv, φZvw, φZwu. FIG. 9 shows the respective waveforms of difference magnetic fluxes φduv, φdvw, φdwu obtained by subtracting residual magnetic fluxes φZuv, φZvw, φZwu from prospective magnetic fluxes φTuv, φTvw, φTwu between the respective lines. FIG. 10 shows the correlation between the closing phase position and magnetizing inrush currents Iiu, Iiv, Iiw for the respective phases caused by the closing phase position in the third state.

In the third state, residual magnetic flux φZuv between the UV phases has the positive polarity and residual magnetic flux φZvw between the VW phases and residual magnetic flux φZwu between the WU phases have the negative polarity. The minimum residual magnetic flux is residual magnetic flux φZwu between the WU phases. The maximum residual magnetic flux is residual magnetic flux φZuv between the UV phases.

As shown in FIG. 8, the phase detection unit 605 detects a phase in which residual magnetic flux φZwu between the WU phases and prospective magnetic flux φTwu between the WU phases coincide in phase range Tmuv set by the magnetic flux between the UV phases as closing target phase Tc. Closing target phase Tc can be detected by detecting a zero point if difference magnetic flux φdwu between the WU phases shown in FIG. 9 is provided.

As shown in FIG. 10, it is understood that, when the circuit-breaker 2 is closed in a phase position of approximately 160 degrees to 170 degrees used as closing target phase Tc, magnetizing inrush currents Iiu, Iiv, Iiw of the respective phases are smaller in comparison with a case wherein it is closed in another phase position.

According to the present embodiment, the following operation and effect can be obtained.

FIG. 11 is a schematic diagram showing one example of a power system to which the magnetizing inrush current suppression device 6 according to the present embodiment is applied.

A transformer 3α is one example of the transformer assumed in this embodiment. The transformer 3α includes a primary winding 301α and secondary winding 302α. The primary winding 301α is Y-connected with the neutral point isolated. The secondary winding 302α is Δ-connected.

Figure 12:
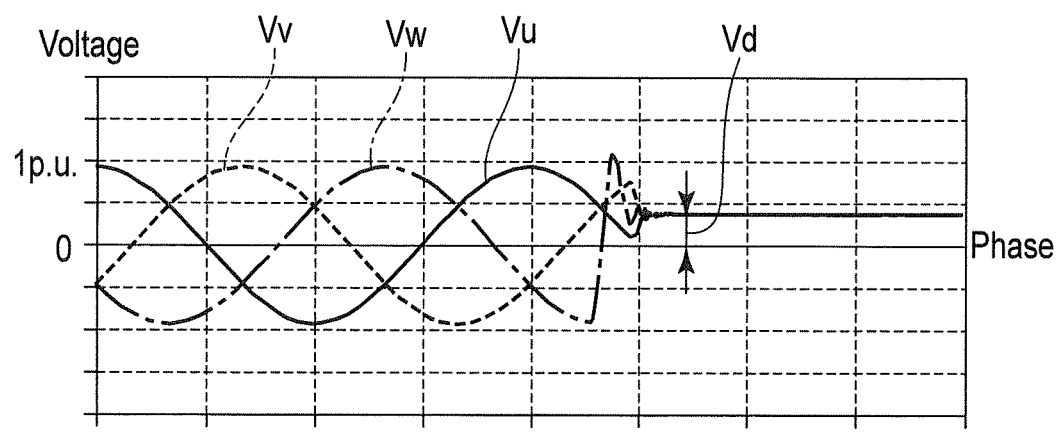
FIG. 12 is a waveform diagram showing a voltage to ground of a primary winding of a transformer when the transformer is interrupted.
Figure 13:
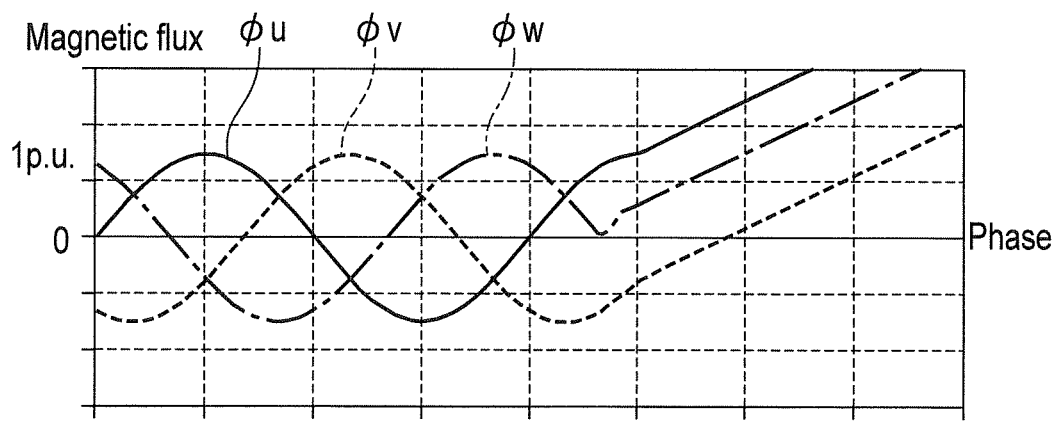
FIG. 13 is a waveform diagram showing magnetic flux calculated by integrating the voltage to ground of the primary winding of the transformer when the transformer is interrupted.

FIG. 12 to FIG. 15 are waveform diagrams showing voltages and magnetic fluxes of the transformer 3α when the transformer 3α is interrupted by use of the circuit-breaker 2 in the power system shown in FIG. 11. FIG. 12 shows voltages to ground Vu, Vv, Vw of the respective phases of the primary winding 301α. FIG. 13 shows magnetic fluxes φu, φv, φw calculated by integrating voltages to ground Vu, Vv, Vw of the respective phases shown in FIG. 12. FIG. 14 shows respective line voltages Vuv, Vvw, Vwu of the secondary winding 302α. FIG. 15 shows magnetic fluxes φuv, φvw, φwu calculated by integrating respective line voltages Vuv, Vvw, Vwu shown in FIG. 14.

As shown in FIG. 12, DC voltage Vd appears on the primary-side neutral point of the transformer 3α after the circuit-breaker 2 interrupts the current. At this time, if an attempt is made to derive residual magnetic fluxes φu, φv, φw by integrating voltages to ground (terminal voltages) Vu, Vv, Vw of the transformer 3α, DC voltage Vd is also integrated. As shown in FIG. 13, thus integrated residual magnetic fluxes φu, φv, φw increase with time and finally diverge. Therefore, if voltages to ground Vu, Vv, Vw are integrated, residual magnetic fluxes φu, φv, φw cannot be precisely calculated.

On the other hand, as shown in FIG. 14, line voltages Vuv, Vvw, Vwu of the Δ-connected secondary winding 302α are not influenced by DC voltage Vd. This is because, for example, the line voltage between the UV phases is obtained by subtracting U-phase voltage to ground Vu from V-phase voltage to ground Vv. Therefore, even if DC voltage Vd appears on the entire portion of the Δ-connected secondary winding 302α, line voltages Vuv, Vvw, Vwu obtained by calculating the difference between two voltages to ground become zero by subtracting superposed DC voltage Vd.

Therefore, as shown in FIG. 15, if residual magnetic fluxes φuv, φvw, φwu are derived by integrating line voltages Vuv, Vvw, Vwu, residual magnetic fluxes φuv, φvw, φwu will not diverge and can be precisely derived.

Thus, since the relationship between prospective magnetic fluxes φTuv, φTvw, φTwu and residual magnetic fluxes φZuv, φZvw, φZwu is derived by integrating line voltages Vuv, Vvw, Vwu in the magnetizing inrush current suppression device 6, closing target phase Tc can be determined without being influenced by neutral point voltage Vd after the transformer 3 is interrupted.

Further, in the transformed 3α shown in FIG. 11, a state in which the impedance of the transformer neutral point is not provided is shown, but an impedance may be connected to the transformer neutral point in some cases in an ineffective grounding system. In this case, the impedance connected to the transformer neutral point may often be a resistor of large value. Thus, even when a resistor of large value is connected to the transformer neutral point, a DC voltage appears on the transformer neutral point. Even with such a transformer, closing target phase Tc can be determined without being influenced by a neutral point voltage by use of the magnetizing inrush current suppression device 6.

Therefore, a magnetizing inrush current can be suppressed by closing the circuit-breaker 2 by use of the magnetizing inrush current suppression device 6 when a DC voltage remains in the transformer 3.

Second Embodiment

Figure 16:
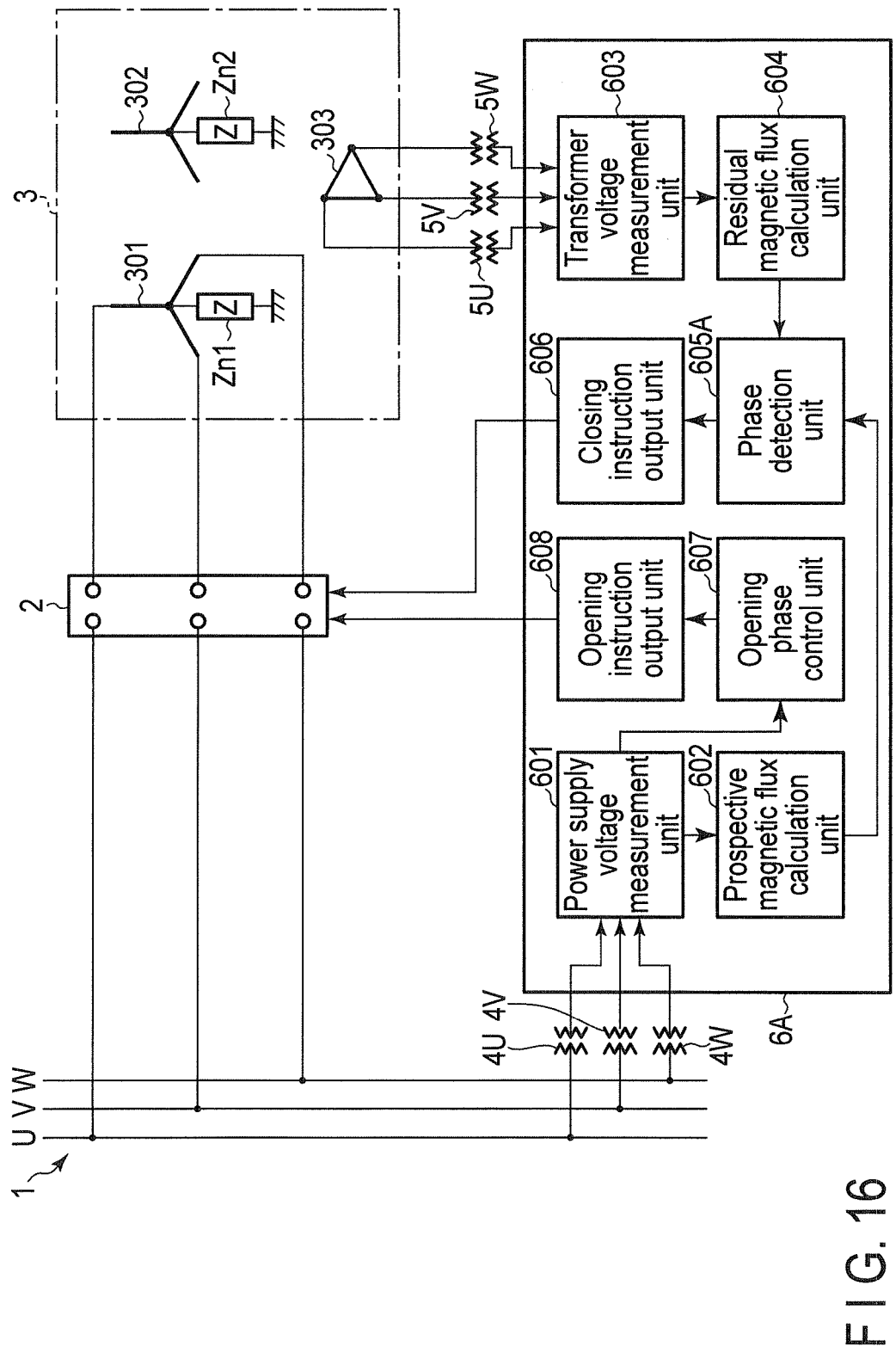
FIG. 16 is a configuration diagram showing the configuration of a power system to which a magnetizing inrush current suppression device according to a second embodiment of the present invention is applied.

FIG. 16 is a configuration diagram showing the configuration of a power system to which a magnetizing inrush current suppression device 6A according to a second embodiment of the present invention is applied.

The magnetizing inrush current suppression device 6A has a configuration obtained by providing a phase, detection unit 605A instead of the phase detection unit 605 in the magnetizing inrush current suppression device 6 according to the first embodiment shown in FIG. 1 and adding an opening phase control unit 607 and opening instruction output unit 608. The remaining configuration is the same as in the magnetizing inrush current suppression device 6 according to the first embodiment.

In the opening phase control unit 607, an opening phase position used for opening a circuit-breaker 2 is previously set. The opening phase position to be set is determined based on a voltage of a power supply bus 1 measured by a power supply voltage measurement unit 601, the characteristic of residual magnetic flux of a transformer 3 calculated by a residual magnetic flux calculation unit 604 and the like after opening the circuit-breaker 2 plural times before operating the magnetizing inrush current suppression device 6A. For example, the opening phase position is a phase position in which a residual magnetic flux between certain lines is set to a maximum (or a phase in which it is set to a minimum).

To the opening phase control unit 607, respective phase voltages Vu, Vv, Vw of the power supply bus 1 measured by the power supply voltage measurement unit 601 are input. The opening phase control unit 607 controls the opening phase position (or interruption phase position) to open the circuit-breaker 2 (or interrupt a current of the circuit-breaker 2) when respective phase voltages Vu, Vv, Vw coincide with a predetermined opening phase position. The opening phase control unit 607 outputs the controlled opening phase position to the opening instruction output unit 608.

The opening instruction output unit 608 outputs an opening instruction to an operation mechanism that drives the main contacts of the circuit-breaker 2 based on an opening phase position received from the opening phase control unit 607. Thus, the circuit-breaker 2 is opened in the opening phase position previously set in the opening phase control unit 607.

To the phase detection unit 605A, residual magnetic fluxes φZuv, φZvw, φZwu calculated by the residual magnetic flux calculation unit 604 and prospective magnetic fluxes φTuv, φTvw, φTwu calculated by the prospective magnetic flux calculation unit 602 are input. Like the first embodiment, the phase detection unit 605A detects closing target phase Tc based on residual magnetic fluxes φZuv, φZvw, φZwu and prospective magnetic fluxes φTuv, φTvw, φTwu. The phase detection unit 605A outputs detected closing target phase Tc to a closing instruction output unit 606.

In this case, the opening phase control unit 607 always controls the phases to open the circuit-breaker 2 in the predetermined opening phase position. Therefore, if the circuit condition of the power system to which the magnetizing inrush current suppression device 6A is applied (the circuit condition from the power supply bus 1 to the transformer 3) is kept unchanged and the opening phase position set in the opening phase control unit 607 is kept unchanged, closing target phase Tc detected by the phase detection unit 605A may always be kept the same.

Therefore, the operation process for detecting closing target phase Tc in the phase detection unit 605A can be simplified by determining that it is unnecessary to change closing target phase Tc. For example, if the circuit condition of the power system and the opening phase position set in the opening phase control unit 607 are not changed, residual magnetic fluxes φZuv, φZvw, φZwu are always kept the same. In this case, the phase detection unit 605A may detect closing target phase Tc based only on prospective magnetic fluxes φTuv, φTvw, φTwu input from the prospective magnetic flux calculation unit 602 even if residual magnetic fluxes φZuv, φZvw, φZwu are not input from the residual magnetic flux calculation unit 604.

Further, when the opening phase position set in the opening phase control unit 607 is determined to set maximum (or minimum) the residual magnetic flux between certain lines, the phase detection unit 605A can detect closing target phase Tc on the assumption that the residual magnetic flux between the certain lines is the maximum (or minimum) residual magnetic flux. In such a case, an opening phase position is set as a phase range having a certain phase width in the opening phase control unit 607. The opening instruction output unit 608 may open the circuit-breaker 2 in a phase position at any time point if it is within the phase range for the opening phase position.

According to this embodiment, the following operation and effect can be obtained in addition to the same operation and effect as in the first embodiment.

After the circuit-breaker 2, transformer 3 and the like are once placed in the power system, the circuit condition of the power system is always kept the same. Therefore, the magnetizing inrush current suppression device 6A can always keep the values of residual magnetic fluxes φZuv, φZvw, φZwu of the transformer 3 at the same values by controlling and always keeping the opening phase position of the circuit-breaker 2 unchanged. As a result, the magnetizing inrush current suppression device 6A can always keep the closing phase position used for suppressing the magnetizing inrush current to the same phase when the circuit-breaker 2 is closed to excite the transformer 3.

Therefore, when transformer tertiary voltage detectors 5U, 5V, 5W are not normally connected, the magnetizing inrush current suppression device 6A can grasp residual magnetic fluxes φZuv, φZvw, φZwu of the transformer 3 after the circuit-breaker 2 is opened. For example, the transformer tertiary voltage detectors 5U, 5V, 5W are connected only at the measurement time to determine an opening phase position to be set in the opening phase control unit 607 and can be disconnected at the operation time of the magnetizing inrush current suppression device 6A.

A phase used for opening the circuit-breaker 2 can be made to have a degree of freedom by setting a phase range for an opening phase position in the opening phase control unit 607. As a result, the magnetizing inrush current suppression device 6A is not required to perform a highly precise control operation for the opening phase position. Further, the phase detection unit 605A can alleviate the operation process for detecting closing target phase Tc according to the intention of the set opening phase position (for setting the absolute value of the residual magnetic flux between certain lines to the maximum, for example).

In the respective embodiments, various parameters used in the phase control operation in the magnetizing inrush current suppression devices 6, 6A may be corrected to further enhance the precision or the like. For example, in the closing operation of the circuit-breaker 2, a preceding discharge called a pre-arc occurring between the main contacts and variation in closing time caused by variation in the operation of the operation mechanism are present. The variation of the closing caused by the pre-arc and the variation at the circuit-breaker closing time can be corrected based on the characteristic thereof when the phase control operation is performed by previously acquiring the characteristic. By making such a correction, the magnetizing inrush current can be more stably suppressed even when the above variations are present.

Further, in the respective embodiments, the respective phase voltages of the power supply bus 1 are measured by use of the power supply voltage detectors 4U, 4V, 4W, but respective line voltages of the power supply bus 1 may be measured. As a result, the operation process for converting the phase voltages to line voltages can be omitted. Further, prospective magnetic fluxes φTuv, φTvw, φTwu may not actually be calculated (integrated). For example, the substantial operation can be considered by taking into consideration that magnetic flux (a value obtained by integrating voltage) is delayed 90 degrees with respect to voltage.

Further, in the respective embodiments, when prospective magnetic fluxes φTuv, φTvw, φTwu and residual magnetic fluxes φZuv, φZvw, φZwu are calculated, magnetic fluxes are derived after voltage conversion, for example, from phase voltages to line voltages, but it is also possible to convert magnetic fluxes after the magnetic fluxes are derived. For example, when magnetic fluxes between the respective lines are derived based on the respective phase voltages, magnetic fluxes of the respective phases are previously derived and then magnetic fluxes between the lines may be derived.

In other operations, if the result becomes the same, the order of operations and the location of the operation (computers, various detectors and the like irrespective of the internal portion or external portion of the magnetizing inrush current suppression devices 6, 6A) may be adequately changed.

Further, in the respective embodiments, the circuit-breaker 2 is the three-phase simultaneous operation type circuit-breaker, but may be single-phase operation type circuit-breakers that operate for respective phases. If the single-phase operation type circuit-breakers are used, the same operation and effect as in the three-phase simultaneous operation type circuit-breaker can be obtained by simultaneously closing the circuit-breakers of the respective phases.

Further, in the respective embodiments, closing target phase Tc is detected in the phase range in which prospective magnetic flux and residual magnetic flux have the same polarity between the lines of residual magnetic flux that is determined to be the maximum, but this is not limitative. For example, in FIG. 2 to FIG. 10, closing target phases Tc are all present in the phase range in which prospective magnetic flux and residual magnetic flux have the same polarity between the lines of second-maximum residual magnetic flux. Therefore, it is possible to determine closing target phases Tc in any manner based on phase positions in which prospective magnetic flux and residual magnetic flux coincide between the lines of minimum residual magnetic flux if magnetizing inrush currents Iiu, Iiv, Iiw can be suppressed.

While certain embodiments according to the present invention have been described, these embodiments have been presented by way of example only, and are not intended to limit the scope of the invention. The novel embodiments described herein may be implemented in a variety of other forms, and various omissions, substitutions, and/or changes may be made therein without departing from the spirit of the inventions. The accompanying claims and their equivalents are intended to cover such forms or modifications as would fall within the scope and spirit of the inventions.

What is claimed is:

1. A magnetizing inrush current suppression device for controlling a circuit-breaker that closes and opens connection between a transformer having a Y-connected primary winding and Δ-connected secondary winding and a three-phase AC power supply to suppress a magnetizing inrush current, the magnetizing inrush current suppression device comprising:
  a power supply-side voltage measurement unit configured to measure three-phase AC voltage on a power supply side of the circuit-breaker;
  a prospective magnetic flux calculation unit configured to calculate prospective magnetic fluxes between three lines of the secondary winding of the transformer based on the three-phase AC voltage measured by the power supply-side voltage measurement unit;
  a transformer voltage measurement unit configured to measure respective terminal voltages of the secondary winding of the transformer;
  a residual magnetic flux calculation unit configured to calculate residual magnetic fluxes between the three lines based on the respective terminal voltages measured by the transformer voltage measurement unit;
  a minimum residual magnetic flux determination unit configured to determine residual magnetic flux of a minimum absolute value among the residual magnetic fluxes between the three lines calculated by the residual magnetic flux calculation unit;
  a closing phase determination unit configured to determine a phase position for suppressing the magnetizing inrush current among phase positions in which the prospective magnetic flux calculated by the prospective magnetic flux calculation unit and the residual magnetic flux calculated by the residual magnetic flux calculation unit coincide between the lines of the minimum residual magnetic flux determined by the minimum residual magnetic flux determination unit, as a closing phase position; and a closing unit configured to simultaneously close the three phases of the circuit-breaker at the closing phase position determined by the closing phase determination unit.

2. The magnetizing inrush current suppression device according to claim 1, wherein the closing phase determination unit determines a phase position for suppressing the magnetizing inrush current among phase positions in which a difference magnetic flux between the prospective magnetic flux calculated by the prospective magnetic flux calculation unit and the residual magnetic flux calculated by the residual magnetic flux calculation unit comes to a zero point, as the closing phase position.

3. The magnetizing inrush current suppression device according to claim 1, further comprising a phase range determination unit configured to determine a phase range in which polarities of the prospective magnetic flux calculated by the prospective magnetic flux calculation unit and the residual magnetic flux calculated by the residual magnetic flux calculation unit coincide between lines other than between the lines of the minimum residual magnetic flux determined by the minimum residual magnetic flux determination unit, wherein the closing phase determination unit determines a phase position that lies in the phase range determined by the phase range determination unit as a phase position for suppressing the magnetizing inrush current.

4. The magnetizing inrush current suppression device according to claim 1, further comprising an opening unit configured to open the circuit-breaker in a predetermined phase range.

5. The magnetizing inrush current suppression device according to claim 4, wherein the opening unit determines the phase range such that an absolute value of residual magnetic flux between lines previously determined among the respective lines of the secondary winding of the transformer is set to a maximum.

6. The magnetizing inrush current suppression device according to claim 4, wherein the opening unit determines the phase range such that an absolute value of residual magnetic flux between lines previously determined among the respective lines of the secondary winding of the transformer is set to a minimum.

7. A magnetizing inrush current suppression method of controlling a circuit-breaker that closes and opens connection between a transformer having a Y-connected primary winding and Δ-connected secondary winding and a three-phase AC power supply to suppress a magnetizing inrush current, the magnetizing inrush current suppression method comprising:

measuring three-phase AC voltage on a power supply side of the circuit-breaker;

calculating prospective magnetic fluxes between three lines of the secondary winding of the transformer based on the measured three-phase AC voltage;

measuring respective terminal voltages of the secondary winding of the transformer;

calculating residual magnetic fluxes between the three lines based on the respective measured terminal voltages;

determining a residual magnetic flux of a minimum absolute value among the calculated residual magnetic fluxes between the three lines;

determining a phase position for suppressing the magnetizing inrush current among phase positions in which the calculated prospective magnetic flux and the calculated residual magnetic flux coincide between the lines of the determined minimum residual magnetic flux, as a closing phase position; and simultaneously closing the three phases of the circuit-breaker at the determined closing phase position.

* * * * *